United States Patent
Oh et al.

(10) Patent No.: US 12,468,206 B2
(45) Date of Patent: Nov. 11, 2025

(54) SEAMLESS HALO DISPLAY WITH AN ADVANCED BLACK MATRIX STRUCTURE

(71) Applicant: Dell Products L.P., Round Rock, TX (US)

(72) Inventors: Guentaek Oh, Singapore (SG); Jaehyun You, Singapore (SG)

(73) Assignee: Dell Products L.P., Round Rock, TX (US)

(*) Notice: Subject to any disclaimer, the term of this patent is extended or adjusted under 35 U.S.C. 154(b) by 602 days.

(21) Appl. No.: 17/962,639

(22) Filed: Oct. 10, 2022

(65) Prior Publication Data

US 2024/0118580 A1    Apr. 11, 2024

(51) Int. Cl.
*G02F 1/1677* (2019.01)
*G02F 1/1679* (2019.01)

(52) U.S. Cl.
CPC .......... *G02F 1/1677* (2019.01); *G02F 1/1679* (2019.01)

(58) Field of Classification Search
CPC ...... G02F 1/1677; G02F 1/1675; G02F 1/167; G02F 1/1679
See application file for complete search history.

(56) References Cited

U.S. PATENT DOCUMENTS

| | | | |
|---|---|---|---|
| 9,170,436 B2* | 10/2015 | Gibson | G02B 6/0003 |
| 2017/0148393 A1 | 5/2017 | Peana | |
| 2020/0013347 A1* | 1/2020 | Bryan-Brown | G02F 1/1677 |
| 2021/0041085 A1 | 2/2021 | Oh et al. | |
| 2023/0040814 A1* | 2/2023 | Amundson | G02F 1/167 |

* cited by examiner

*Primary Examiner* — Vinh T Lam
(74) *Attorney, Agent, or Firm* — Larson Newman, LLP (57) ABSTRACT

A display for an information handling system includes a front panel, multiple halos, and a matrix structure. The halos are located behind the front panel, and each of the halos transitions between a closed position and an open position. The matrix structure is located along both sides and a top portion of the front panel. The matrix structure includes multiple color filter pixels, multiple patterned charge components, and multiple electronic ink balls. The patterned charge components are placed in either of first and second charge states. The electronic ink balls are disposed in between the color filter pixels and the patterned charge components. Each of the electronic ink balls includes a white portion and a black portion, and transitions between first and second orientations based on whether the patterned charge components are in the first charge state or the second charge state.

20 Claims, 6 Drawing Sheets

SEAMLESS HALO DISPLAY WITH AN ADVANCED BLACK MATRIX STRUCTURE

FIELD OF THE DISCLOSURE

The present disclosure generally relates to information handling systems, and more particularly relates to a seamless halo display with an advanced black matrix structure.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs, and requirements can vary between different applications. Thus, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

A display for an information handling system includes a front panel, multiple halos, and a matrix structure. The halos are located behind the front panel, and each of the halos may transition between a closed position and an open position. The matrix structure is located along both sides and a top portion of the front panel. The matrix structure includes multiple color filter pixels, multiple patterned charge components, and multiple electronic ink balls. The patterned charge components may be placed in either of first and second charge states. The electronic ink balls are disposed in between the color filter pixels and the patterned charge components. Each of the electronic ink balls includes a white portion and a black portion, and may transition between first and second orientations based on whether the patterned charge components are in the first charge state or the second charge state.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Figure 1:
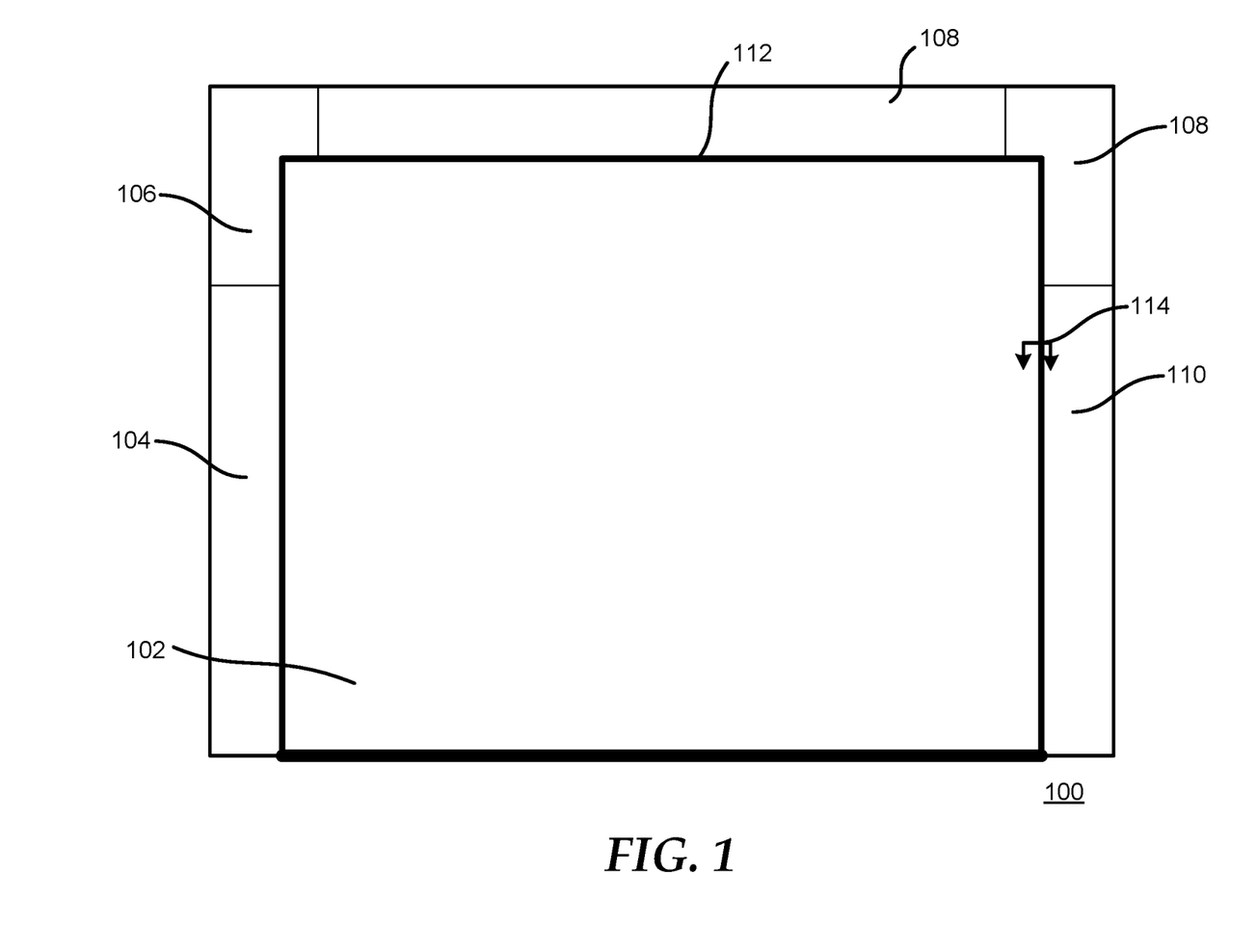
FIG. 1 is a diagram of a display of an information handling system according to at least one embodiment of the present disclosure.

FIG. 1 is a diagram of a display 100 of an information handling system according to at least one embodiment of the present disclosure. For purposes of this disclosure, an information handling system can include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (such as a desktop or laptop), tablet computer, mobile device (such as a personal digital assistant (PDA) or smart phone), blade server or rack server, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Display 100 includes a front panel 102, halos 104, 106, 108, and 110, and a matrix structure 112. Halos 104, 106, 108, and 110 may be formed from a rear cover of display 100, and each of the halos may slide between a closed position and an open position. In certain examples, each of halos 104, 106, 108, and 110 may be any other type of baffle that captures and redirects an output of bias lighting. Using the described halos 104, 106, 108, and 110 as a single halo provides a predictable medium by which bias lighting may be provided and for which bias lighting for a particular type of display 100 can be specially configured.

In an example, matrix structure 112 may be located along both sides and the top of front panel 102 of display 100, and may provide a transition between the display screen and halos 104, 106, 108, and 110. Matrix structure 112 may be a solid black color or may be any combination of colors as will be described herein. In this manner, matrix structure 112 may be configured to provide a black transition or a seamless color transition between front panel 102 and halos 104, 106, 108, and 110. Option of matrix structure 112 will be described with respect to a cross section of front panel 102 and matrix structure 112 of display 100 taken along line 114 in FIGS. 2-4 below.

Figure 2:
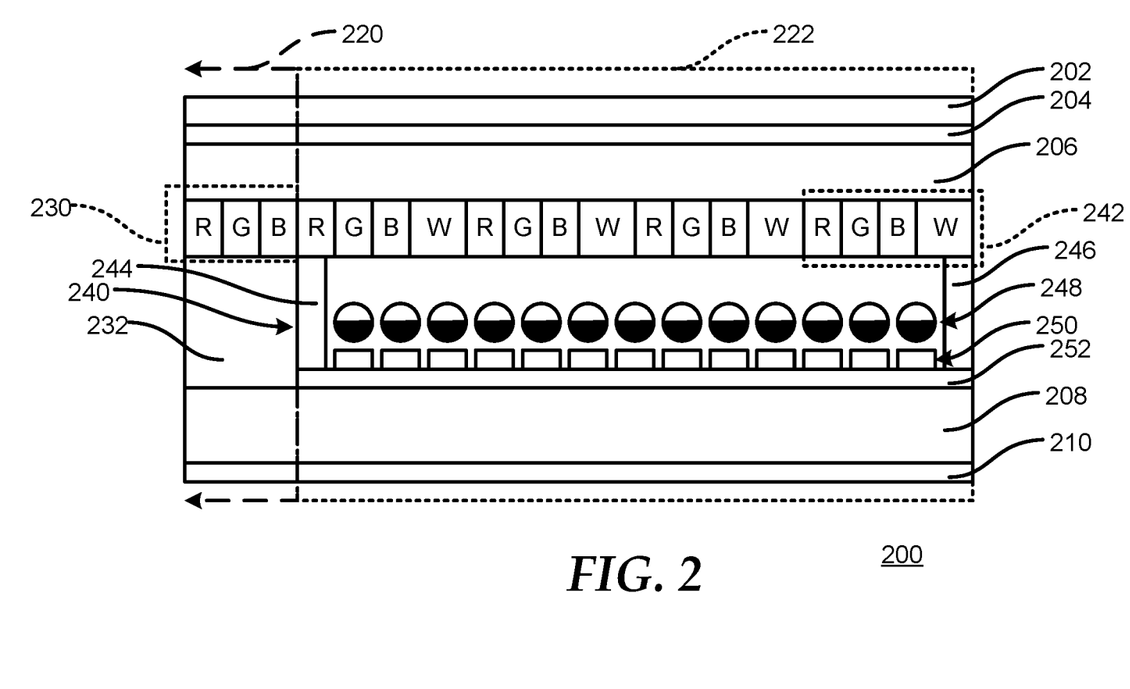
FIGS. 2-4 are diagrams illustrating a cross section of a portion of a display of an information handling system according to at least one embodiment of the present disclosure.
Figure 3:
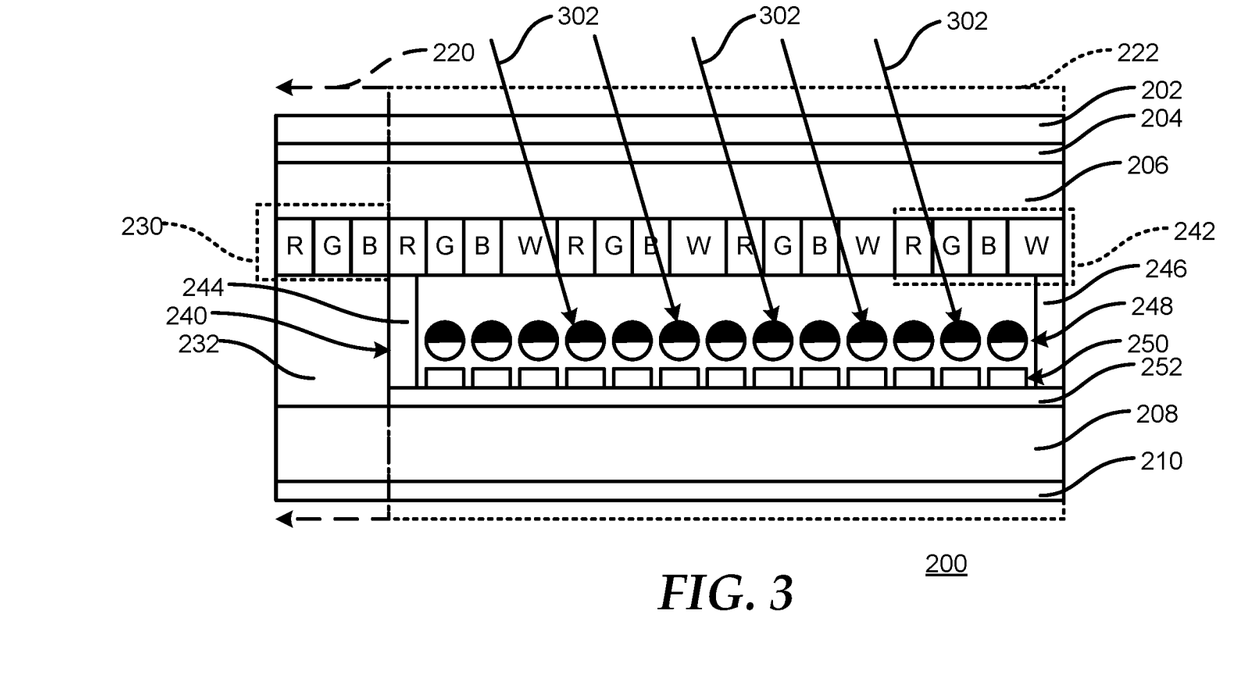
Figure 4:
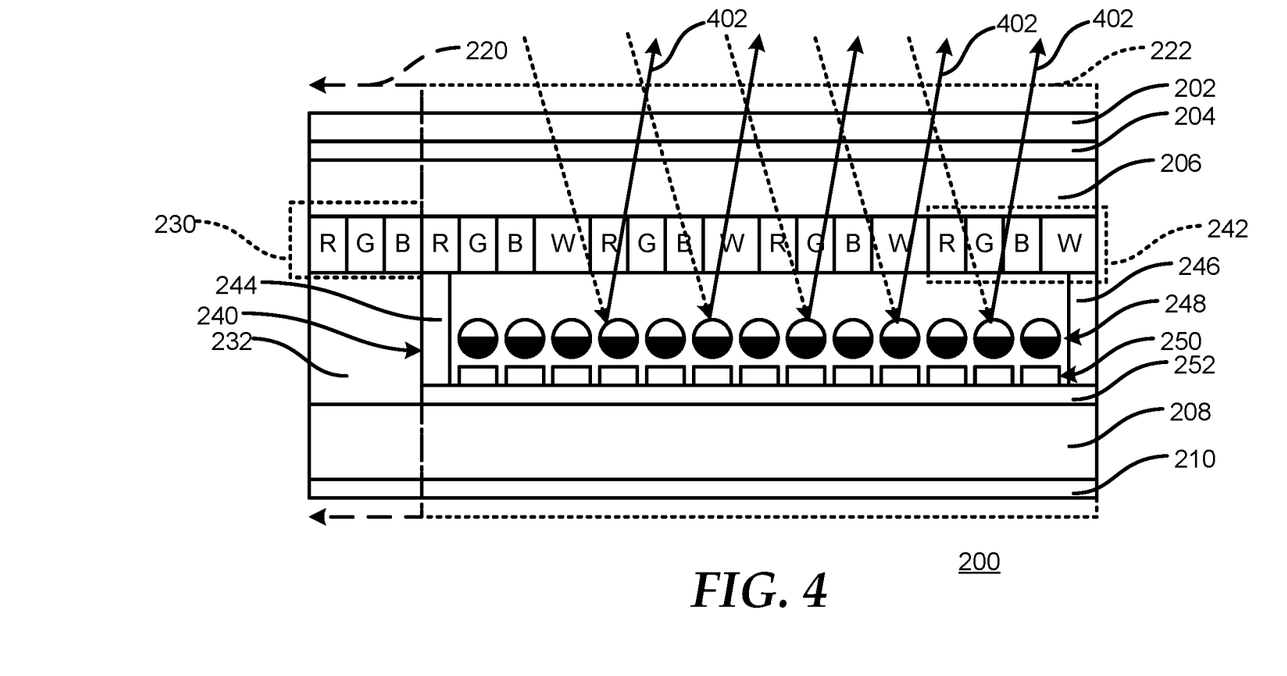

FIGS. 2-4 illustrate a cross section 200 of a portion of display 100 of FIG. 1 according to at least one embodiment of the present disclosure. Cross section 200 of display 100 illustrates a top polarizer 202, an indium tin oxide (ITO) layer 204, a color filter (CF) glass 206, a thin-film transistor (TFT) glass 208, and a bottom polarizer 210. Display 100 includes an active portion 220 and a matrix portion 222. Active portion 220 includes multiple pixels 230 and a liquid crystal layer 232. In an example, each pixel 230 includes red, green, and blue color filters, which in turn may be utilized to allow different amounts of light through each color filter to create different colors on front panel 102 of display 100. In certain examples, pixels 230 of active portion 220 provide an output image from the information handling system.

Matrix portion 222 includes a matrix structure 240, which in turn includes multiple pixels 242, dual sealants 244 and 246, multiple electronic ink balls 248, a patterned charge component 250, and a gate in panel (GIP) layer 252. In an example, electronic ink balls 248 may be any suitable shape capable of flipping or rotating from one side to the other, such as a sphere, a prolate spheroid, or the like. In certain examples, patterned charge component 250 may be any suitable material that is capable of receiving and being held at a particular charge, such as indium tin oxide (ITO). In an example, each of patterned charge components 250 may be a different ITO component, such that each of the components may correspond to a different electronic ink ball 248.

In certain examples, pixels 230 of active portion 220 and pixels 242 of matrix portion 222 may form a layer within CF glass 206, such that multiple colors may be provided from both the active and matrix portions. In an example, each pixel 242 within matrix structure 240 may include red, green, blue, and white color filters. In this example, the red, green, and blue color filters of pixels 242 may display color from matrix structure 240 and the white color filter may increase the transmittance of the pixels.

In an example, sealants 244 and 246 may extend from GIP layer 252 to pixels 242. In this example, sealants 244 and 246 may prevent light from LC layer 232 and from halos 104, 106, 108, and 108 of FIG. 1 from penetrating into matrix structure 240. While only a single row of electronic ink balls 248 and patterned charge components 250 have be shown in FIGS. 2-4, matrix structure 240 may include may suitable number of rows of the electronic ink balls and patterned charge components to extend the length and width of matrix structure 112 around both sides and the top of front panel 102 of display 100 in FIG. 1.

In certain examples, each electronic ink ball 248 may include two portions, such that one portion is white in color and the other portion is black in color. Additionally, each portion of an electronic ink ball 248 may have a different magnetic charge. For example, the black color portion of electronic ink ball 248 may have either a positive magnetic charge or a negative magnetic charge, and the white color portion may have the opposite charge as compared to the black color portion. In this example, either the white portion or the black portion of each electronic ink ball 248 may be positioned to face top polarizer 202 of display 100 based on a charge placed on each of patterned charge components 250 as will be described below.

Referring now to FIG. 3, each of patterned charge components 250 may be placed in a first charge state based on any suitable input. In an example, a matrix color/black indication or selection may be received from a user of an information handling system, such as information handling system 600 of FIG. 6. For example, a user may utilize a graphical user interface (GUI) to select whether matrix structure 240 is configured as providing a color or only black.

Figure 6:
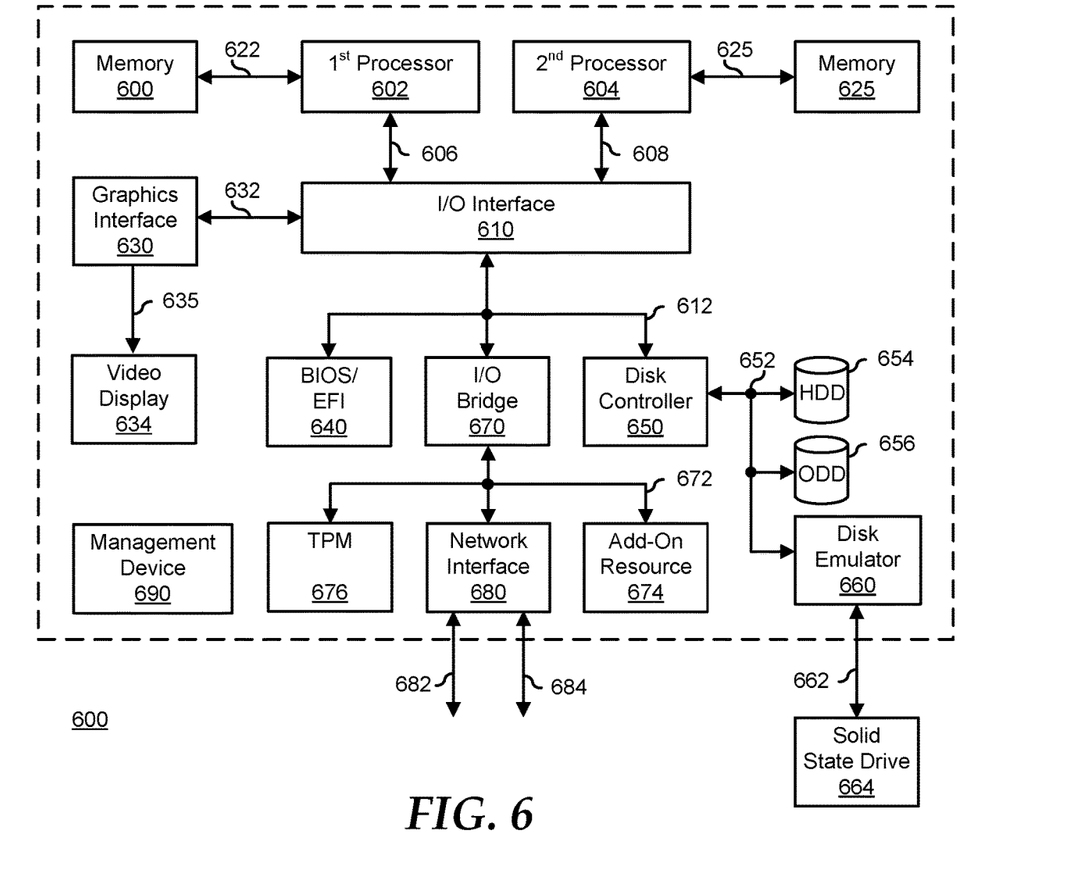
FIG. 6 is a block diagram of a general information handling system according to an embodiment of the present disclosure.

In response to the reception of the matrix color/black indication, a processor, such as processor 602 of FIG. 6, may determine whether the indication is for matrix structure 450 to provide colors similar to halos 104, 106, 108, and 110 or to provide only black. In response to the indication being for a black matrix structure, a processor may cause patterned charge components 250 to be set to a first charge state. Based on the first charge of patterned charge components 250, electronic ink balls 250 are held in a first orientation. In an example, the first orientation of the electronic ink balls has a black portion of electronic ink balls 248 facing top polarizer 202 of display 100. In response to the black portion of the electronic ink balls 248 facing top polarizer 202 of display 100, the electronic ink balls may absorb light 302, which in turn may cause the matrix structure to only have black coloring. For example, based on the black portion of electronic ink balls 248 absorbing light 302, no light is reflected to the red, green, blue, and white color filters of pixels 242 in matrix structure 240 such that the matrix structure is black in color.

Referring now to FIG. 3, in response to the indication being for a color matrix structure, a processor may set patterned charge components 250 to a second charge state. Based on the second charge of patterned charge components 250, electronic ink balls 248 are held in a second orientation. In an example, the second orientation of electronic ink balls 248 may cause a white portion of the electronic ink balls to face top polarizer 202 of display 100. In response to the white portion of electronic ink balls 248 facing top polarizer 202 of display 100, the electronic ink balls may reflect light 402 to pixels 242 of matrix structure 240, which in turn may cause the matrix structure to produce one or more colors based on red, green, blue, and white color filters pixels 242. In an example, the second orientation of electronic ink balls 248 may provide a seamless transition between the active portion 220 of front panel 102 and halos 104, 106, 108, and 110.

Figure 5:
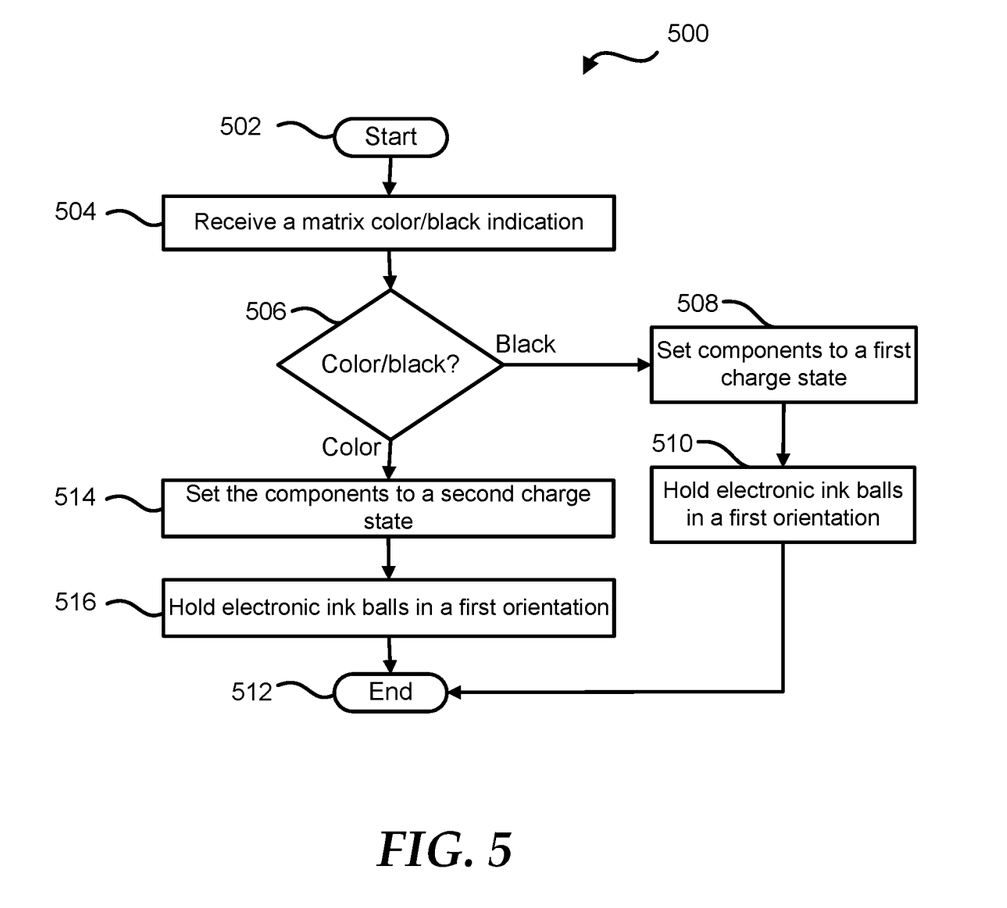
FIG. 5 is a flow diagram of a method for setting a color state in a seamless halo display with an advanced black matrix structure according to at least one embodiment of the present disclosure.

FIG. 5 shows a method 500 for setting a color state in a seamless halo display with an advanced black matrix structure according to at least one embodiment of the present disclosure, starting at block 502. In an example, the method 500 may be performed by any suitable component including, but not limited to, processors 602 and 604 of FIG. 6. Not every method step set forth in this flow diagram is always necessary, and certain steps of the methods may be combined, performed simultaneously, in a different order, or perhaps omitted, without varying from the scope of the disclosure.

At block 504, a matrix color/black indication is received. In an example, the matrix color/black indication may be received from a user of an information handling system. For example, a user may utilize a graphical user interface (GUI) to select whether a matrix structure on the display is black or color. In certain examples, the matrix structure may be located along both sides and the top of the display, and may provide a transition between the display screen and the halo.

At block 506, a determination is made whether the indication is for the matrix structure to provide colors similar to the halo or to provide only black. In response to the indication being for a black matrix structure, components within the matrix are set to a first charge state at block 508. In an example, one of the first and second charge states is a positive magnetic charge state and the other charge state is a negative magnetic charge. In certain examples, the components may be any suitable material that is capable of receiving and being held at a particular charge, such as indium tin oxide (ITO). In an example, the components may be a patterned ITO such that each of the components may be a different portion of the patterned ITO.

At block 510, based on the first charge of the components, electronic ink balls are held in a first orientation and the flow ends at block 512. In an example, the first orientation of the electronic ink balls has a black portion of the electronic ink balls facing a top of the display screen. In response to the black portion of the electronic ink balls facing the top of the display screen, the electronic ink balls may absorb light, which in turn may cause the matrix structure to only have black coloring.

In response to the indication being for a color matrix structure, the components are set to a second charge state at block 514. At block 516, based on the second charge of the components, electronic ink balls are held in a second orientation and the flow ends at block 512. In an example, the second orientation of the electronic ink balls has a white portion of the electronic ink balls facing the top of the display screen. In response to the white portion of the electronic ink balls facing the top of the display screen, the electronic ink balls may reflect light to the pixels of the matrix structure, which in turn may cause the matrix structure to produce one or more colors based on the pixels in the matrix structure.

FIG. 6 shows a generalized embodiment of an information handling system 600 according to an embodiment of the present disclosure. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 600 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 600 can include processing resources for executing machine-executable code, such as a central processing unit (CPU), a programmable logic array (PLA), an embedded device such as a System-on-a-Chip (SoC), or other control logic hardware. Information handling system 600 can also include one or more computer-readable medium for storing machine-executable code, such as software or data. Additional components of information handling system 600 can include one or more storage devices that can store machine-executable code, one or more communications ports for communicating with external devices, and various input and output (I/O) devices, such as a keyboard, a mouse, and a video display. Information handling system 600 can also include one or more buses operable to transmit information between the various hardware components.

Information handling system 600 can include devices or modules that embody one or more of the devices or modules described below and operates to perform one or more of the methods described below. Information handling system 600 includes a processors 602 and 604, an input/output (I/O) interface 610, memories 620 and 625, a graphics interface 630, a basic input and output system/universal extensible firmware interface (BIOS/UEFI) module 640, a disk controller 650, a hard disk drive (HDD) 654, an optical disk drive (ODD) 656, a disk emulator 660 connected to an external solid state drive (SSD) 662, an I/O bridge 670, one or more add-on resources 674, a trusted platform module (TPM) 676, a network interface 680, a management device 690, and a power supply 1695. Processors 602 and 604, I/O interface 610, memory 620, graphics interface 630, BIOS/UEFI module 640, disk controller 650, HDD 654, ODD 656, disk emulator 660, SSD 662, I/O bridge 670, add-on resources 674, TPM 676, and network interface 680 operate together to provide a host environment of information handling system 600 that operates to provide the data processing functionality of the information handling system. The host environment operates to execute machine-executable code, including platform BIOS/UEFI code, device firmware, operating system code, applications, programs, and the like, to perform the data processing tasks associated with information handling system 600.

In the host environment, processor 602 is connected to I/O interface 610 via processor interface 606, and processor 604 is connected to the I/O interface via processor interface 608. Memory 620 is connected to processor 602 via a memory interface 622. Memory 625 is connected to processor 604 via a memory interface 627. Graphics interface 630 is connected to I/O interface 610 via a graphics interface 632 and provides a video display output 636 to a video display 634. In a particular embodiment, information handling system 600 includes separate memories that are dedicated to each of processors 602 and 604 via separate memory interfaces. An example of memories 620 and 630 include random access memory (RAM) such as static RAM (SRAM), dynamic RAM (DRAM), non-volatile RAM (NV-RAM), or the like, read only memory (ROM), another type of memory, or a combination thereof.

BIOS/UEFI module 640, disk controller 650, and I/O bridge 670 are connected to I/O interface 610 via an I/O channel 612. An example of I/O channel 612 includes a Peripheral Component Interconnect (PCI) interface, a PCI-Extended (PCI-X) interface, a high-speed PCI-Express (PCIe) interface, another industry standard or proprietary communication interface, or a combination thereof. I/O interface 610 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/UEFI module 640 includes BIOS/UEFI code operable to detect resources within information handling system 600, to provide drivers for the resources, initialize the resources, and access the resources. BIOS/UEFI module 640 includes code that operates to detect resources within information handling system 600, to provide drivers for the resources, to initialize the resources, and to access the resources.

Disk controller 650 includes a disk interface 652 that connects the disk controller to HDD 654, to ODD 656, and to disk emulator 660. An example of disk interface 652 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 660 permits SSD 664 to be connected to information handling system 600 via an external interface 662. An example of external interface 662 includes a USB interface, an IEEE 3394 (Firewire) interface, a proprietary interface, or a combination thereof. Alternatively, solid-state drive 664 can be disposed within information handling system 600.

I/O bridge 670 includes a peripheral interface 672 that connects the I/O bridge to add-on resource 674, to TPM 676, and to network interface 680. Peripheral interface 672 can be the same type of interface as I/O channel 612 or can be a different type of interface. As such, I/O bridge 670 extends the capacity of I/O channel 612 when peripheral interface 672 and the I/O channel are of the same type, and the I/O bridge translates information from a format suitable to the I/O channel to a format suitable to the peripheral channel 672 when they are of a different type. Add-on resource 674 can include a data storage system, an additional graphics interface, a network interface card (NIC), a sound/video processing card, another add-on resource, or a combination thereof. Add-on resource 674 can be on a main circuit board, on separate circuit board or add-in card disposed within information handling system 600, a device that is external to the information handling system, or a combination thereof.

Network interface 680 represents a NIC disposed within information handling system 600, on a main circuit board of the information handling system, integrated onto another component such as I/O interface 610, in another suitable location, or a combination thereof. Network interface device 680 includes network channels 682 and 684 that provide interfaces to devices that are external to information handling system 600. In a particular embodiment, network channels 682 and 684 are of a different type than peripheral channel 672 and network interface 680 translates information from a format suitable to the peripheral channel to a format suitable to external devices. An example of network channels 682 and 684 includes InfiniBand channels, Fibre Channel channels, Gigabit Ethernet channels, proprietary channel architectures, or a combination thereof. Network channels 682 and 684 can be connected to external network resources (not illustrated). The network resource can include another information handling system, a data storage system, another network, a grid management system, another suitable resource, or a combination thereof.

Management device 690 represents one or more processing devices, such as a dedicated baseboard management controller (BMC) System-on-a-Chip (SoC) device, one or more associated memory devices, one or more network interface devices, a complex programmable logic device (CPLD), and the like, which operate together to provide the management environment for information handling system 600. In particular, management device 690 is connected to various components of the host environment via various internal communication interfaces, such as a Low Pin Count (LPC) interface, an Inter-Integrated-Circuit (I2C) interface, a PCIe interface, or the like, to provide an out-of-band (00B) mechanism to retrieve information related to the operation of the host environment, to provide BIOS/UEFI or system firmware updates, to manage non-processing components of information handling system 600, such as system cooling fans and power supplies. Management device 690 can include a network connection to an external management system, and the management device can communicate with the management system to report status information for information handling system 600, to receive BIOS/UEFI or system firmware updates, or to perform other task for managing and controlling the operation of information handling system 600.

Management device 690 can operate off of a separate power plane from the components of the host environment so that the management device receives power to manage information handling system 600 when the information handling system is otherwise shut down. An example of management device 690 include a commercially available BMC product or other device that operates in accordance with an Intelligent Platform Management Initiative (IPMI) specification, a Web Services Management (WSMan) interface, a Redfish Application Programming Interface (API), another Distributed Management Task Force (DMTF), or other management standard, and can include an Integrated Dell Remote Access Controller (iDRAC), an Embedded Controller (EC), or the like. Management device 690 may further include associated memory devices, logic devices, security devices, or the like, as needed or desired.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. A display for an information handling system, the display comprising:
    a front panel;
    a plurality of halos located behind the front panel, each of the halos to transition between a closed position and an open position; and
    a matrix structure located along both sides and a top portion of the front panel, the matrix structure including:
        a plurality of color filter pixels;
        a plurality of patterned charge components, the patterned charge components to be placed in either of first and second charge states; and
        a plurality of electronic ink balls disposed between the color filter pixels and the patterned charge components, each of the electronic ink balls including a white portion and a black portion, each of the electronic ink balls transitioning between first and second orientations based on whether the patterned charge components are in the first charge state or the second charge state.

2. The display of claim 1, wherein the front panel includes an active portion to provide an output image from the information handling system.

3. The display of claim 1, wherein the matrix structure includes dual sealants to prevent light from the front panel and light from the halos from entering the matrix structure.

4. The display of claim 1, wherein based on the electronic ink balls being in the first orientation the matrix structure provides only a black color.

5. The display of claim 1, wherein based on the electronic ink balls being in the second orientation the matrix structure provides a plurality of colors.

6. The display of claim 1, wherein based on the electronic ink balls being in the second orientation the matrix structure provides a seamless transition between the front panel and the halos.

7. The display of claim 1, wherein each color filter pixel includes a red filter, a green filter, a blue filter, and a white filter.

8. The display of claim 1, wherein the black portion of each electronic ink ball is a positive charge and the white portion of each electronic ink ball is a negative charge.

9. The display of claim 1, wherein the first charge state is a positive charge and the second charge state is a negative charge.

10. A display for an information handling system, the display comprising:
   a front panel;
   a plurality of halos located behind the front panel, each of the halos to transition between a closed position and an open position; and
   a matrix structure located along both sides and a top portion of the front panel, the matrix structure including:
      dual sealants to prevent light from the front panel and light from the halos from entering the matrix structure;
      a plurality of color filter pixels;
      a plurality of patterned charge components, the patterned charge components to be placed in either of first and second charge states; and
      a plurality of electronic ink balls disposed in between the color filter pixels and the patterned charge components, each of the electronic ink balls including a white portion and a black portion, each of the electronic ink balls transitioning between first and second orientations based on whether the patterned charge components are in the first charge state or the second charge state, wherein based on the electronic ink balls being in the first orientation the matrix structure provides only a black color, wherein based on the electronic ink balls being in the second orientation the matrix structure provides a plurality of colors.

11. The display of claim 10, wherein the front panel includes an active portion to provide an output image from the information handling system.

12. The display of claim 10, wherein based on the electronic ink balls being in the second orientation the matrix structure provides a seamless transition between the front panel and the halos.

13. The display of claim 10, wherein each color filter pixel includes a red filter, a green filter, a blue filter, and a white filter.

14. The display of claim 10, wherein the black portion of each electronic ink ball is a positive charge and the white portion of each electronic ink ball is a negative charge.

15. The display of claim 10, wherein the first charge state is a positive charge and the second charge state is a negative charge.

16. A method comprising:
   receiving, by a processor of an information handling system, a matrix color/black indication;
   based on the matrix color/black indication, determining whether to cause a matrix structure of a display to provide multiple colors or only a black color;
   in response to the matrix structure to only provide the black color, setting a plurality of patterned components within the matrix structure to a first charge state;
   based on the patterned charge components being in the second charge state, holding a plurality of electronic ink balls in a first orientation;
   in response to the matrix structure providing the multiple colors, setting the patterned charge components to a second charge state; and
   based on the patterned charge components being the in the second charge state, holding a plurality of electronic ink balls in a second orientation.

17. The method of claim 16, wherein based on the electronic ink balls being in the second orientation the matrix structure provides a seamless transition between a front panel and a plurality of halos.

18. The method of claim 16, wherein based on the electronic ink balls being in the first orientation a black portion of each of the electronic ink balls to absorb light to only provide the black color.

19. The method of claim 16, wherein based on the electronic ink balls being in the second orientation a white portion of each of the electronic ink balls to reflect light to a plurality of color filter pixels in the matrix structure.

20. The method of claim 19, wherein each color filter pixel includes a red filter, a green filter, a blue filter, and a white filter.

* * * * *